United States Patent [19]
Wright et al.

[11] Patent Number: 6,116,216
[45] Date of Patent: Sep. 12, 2000

[54] ENGINE MANIFOLD VALVE CONTROL

[75] Inventors: William K. Wright; Daniel Nelson, both of Herdsman, Australia

[73] Assignees: Orix Vehicle Technology Pty Ltd, Double Bay; Transom NGVS Research Pty Ltd, Herdsman, both of Australia

[21] Appl. No.: 09/269,790

[22] PCT Filed: Oct. 1, 1997

[86] PCT No.: PCT/AU97/00657

§ 371 Date: Jun. 17, 1999

§ 102(e) Date: Jun. 17, 1999

[87] PCT Pub. No.: WO98/14856

PCT Pub. Date: Apr. 9, 1998

[30] Foreign Application Priority Data

Oct. 1, 1996 [AU] Australia ................................. PO2716

[51] Int. Cl.[7] ................................................ F02D 9/00
[52] U.S. Cl. ........................................ 123/399; 123/361
[58] Field of Search ................................. 123/399, 361, 123/376, 478, 480

[56] References Cited

U.S. PATENT DOCUMENTS

| | | | |
|---|---|---|---|
| 4,138,979 | 2/1979 | Taplin | 123/436 |
| 4,391,250 | 7/1983 | Matsui | 123/438 |
| 4,467,758 | 8/1984 | Ueno et al. | 123/198 F |
| 4,471,741 | 9/1984 | Asik et al. | 123/399 |
| 4,539,967 | 9/1985 | Nakajima et al. | 123/585 |
| 4,548,185 | 10/1985 | Pozniak | 123/478 |
| 4,769,583 | 9/1988 | Goor | 318/568.18 |
| 5,520,146 | 5/1996 | Hrovat et al. | 123/336 |
| 5,572,255 | 11/1996 | Abe et al. | 348/294 |

FOREIGN PATENT DOCUMENTS

| | | |
|---|---|---|
| 659991 A2 | 11/1994 | European Pat. Off. . |
| 932753 | 4/1998 | European Pat. Off. . |
| 8-144820 | 6/1996 | Japan . |
| 8-165947 | 6/1996 | Japan . |

*Primary Examiner*—Henry C. Yuen
*Assistant Examiner*—Hieu T. Vo
*Attorney, Agent, or Firm*—Nixon & Vanderhye

[57] ABSTRACT

A manifold valve controller (30, 32) designed to be embedded within the casing (24) of a throttle actuator in a manifold valve assembly for a gas fueled internal combustion engine. The controller (30, 32) senses the current position and current velocity of the valve (14) and calculates a rest position of the valve (14) if the valve commenced deceleration from its current position and velocity. The controller (30, 32) then compares the calculated rest position with a demanded position for the manifold valve (14) in order to determine whether the current position or the rest position exceeds the demanded position The controller (30, 32) then accelerates or decelerates the valve (14) to the demanded position as required, based on the comparison A feedback position sensor such as a potentiometer (22) provides the means for sensing the current position and velocity of the valve (14). By locating the controller (30) as close as possible to feedback potentiometer (22) problems caused by background electrical noise are minimized.

12 Claims, 3 Drawing Sheets

ENGINE MANIFOLD VALVE CONTROL

FIELD OF THE INVENTION

The present invention relates to a method and apparatus for controlling the position of an engine manifold valve and relates particularly, though not exclusively, to such a method and controller for controlling throttle position in a gas fuelled internal combustion engine.

BACKGROUND TO THE INVENTION

The previous engine management systems developed by Transcom Gas Technologies Pty Ltd, such as that described in PCT/AU93/00649 (WO94/13946), employed a stepper motor based throttle actuator coupled via a gear box and linkages to a throttle valve. This mechanism proved to be unreliable and inaccurate due to the lack of feedback. The inaccuracy of this mechanism was further exacerbated by the open loop control strategies employed by the previous control systems, which required repeatable positioning of the valve. Furthermore, the complete stepper motor, gearbox and throttle valve assembly was bulky and connected via adjustable linkages which if varied affected the engine tuning.

This prior art stepper motor throttle actuator achieved variable resolutions using a lever and linkage mechanism. The transfer function between the number of 1.8° stepper motor steps and throttle valve angle gave extremely high resolution at low step numbers which correspond to the engine's idle setting, where the greatest control is required. The step number at idle was approximately 30, while the throttle angle difference between step 30 and 31 was 0.000956 radians. The throttle travels through 1.202835 radians between its fully open and fully closed positions. Therefore the number of steps required to achieve the same resolution at idle for a fixed resolution is at least 1258 (1.202835/0.000956) steps.

SUMMARY OF THE INVENTION

The present invention was developed with a view to providing a controller and method for controlling the position of an engine manifold (throttle) valve which is more accurate than the previous throttle actuator control mechanism, and which can provide the same or better control resolution.

According to one aspect of the present invention there is provided a method for controlling the position of an engine manifold valve, the method comprising the steps of:

sensing the current position and current velocity of the valve;

calculating a rest position of the valve using said sensed current position and current velocity, wherein said rest position corresponds to a stationary position reached if the valve commenced deceleration from its current position and velocity;

comparing said calculated rest position with a demanded position for the valve in order to determine whether the current position or the rest position exceeds the demanded position; and, accelerating/decelerating the valve to the demanded position as required, based on said comparison.

Typically said step of accelerating/decelerating comprises calculating a motion trajectory that involves accelerating the valve to a maximum velocity, holding it at the maximum velocity and then decelerating the valve to a stop at the demanded position.

Preferably said motion trajectory is calculated such that if the valve is opening and the calculated rest position is less than the demanded position, and the maximum velocity has not yet been reached, then the valve is caused to continue to accelerate, whereas if the calculated rest position is equal to, or greater than the demanded position then the valve is caused to decelerate.

Preferably said motion trajectory is calculated such that if the current position exceeds the demanded position or the current velocity of the throttle is such that it cannot decelerate to a stop without passing the demanded position, then the valve is caused to decelerate to a stop and reverse to the demanded position.

According to another aspect of the present invention there is provided a manifold valve controller for controlling the position of an engine manifold valve the controller comprising:

means for sensing the current position and current velocity of the valve;

control processing means for calculating a rest position of the valve using said sensed current position and current velocity, wherein said rest position corresponds to a stationary position reached if the valve commenced deceleration from its current position and velocity; comparing said calculated rest position with a demanded position in order to determine whether the current position or rest position exceeds the demanded position; and, generating a control signal for accelerating/decelerating the valve to the demanded position as required.

Advantageously the controller is embedded within the housing of a throttle actuator which incorporates a throttle body, a butterfly valve, a servomotor and associated gearing, and a feedback position sensor. Preferably said means for sensing the current position and current velocity of the valve comprises said feedback position sensor. Preferably said feedback position sensor is a potentiometer.

BRIEF DESCRIPTION OF DRAWINGS

In order to facilitate a better understanding of the present invention a preferred embodiment of the manifold valve controller will now be described in detail, by way of example only, with reference to the accompanying drawings in which:

FIG. 1 illustrates schematically a commercially available VDO 75 mm valve assembly and actuator which was fitted to the intake manifold of a diesel engine converted to operate on compressed natural gas (CNG). The VDO throttle actuator 10 comprises a throttle body 12, a butterfly valve 14 which pivots on a valve shaft 16 connected to a DC servomotor 18 via associated gearing 20. A servomotor does not inherently provide any position information, and therefore some form of position sensor element must be incorporated into the actuator assembly. In the VDO throttle actuator a potentiometer 22 is connected to the valve shaft 16. The advantage of a potentiometer is that it provides an absolute indication of position unlike most digital encoders. A possible disadvantage is that the physical contact between the resistive track and the contact fingers may eventually lead to wear and failure.

As noted above, for this device to replace the earlier stepper motor throttle actuator it will need to achieve a repeatable resolution of at least 1258 discreet positions for a span of 1.2 radians. With a 5 volt reference signal applied to the feedback potentiometer 22 and using a 5 digit multimeter a resolution of 0.1 millivolts was measured. Therefore, the potentiometer 22 supplied with the VDO valve, throttle actuator will provide the required resolution. To digitise the feedback voltage to a minimum of 1258 steps, at least 11 bits will be required. In practice, a 12 bit analog to digital converter was used. However, the commercially available VDO throttle actuator is not provided with a controller. In order to achieve the required resolution, a controller would need to detect feedback voltage changes of approximately 3.5 millivolts, which is relatively difficult in an automotive environment in view of the background electrical noise caused by the ignition coils and other electrical signals.

Figure 1:
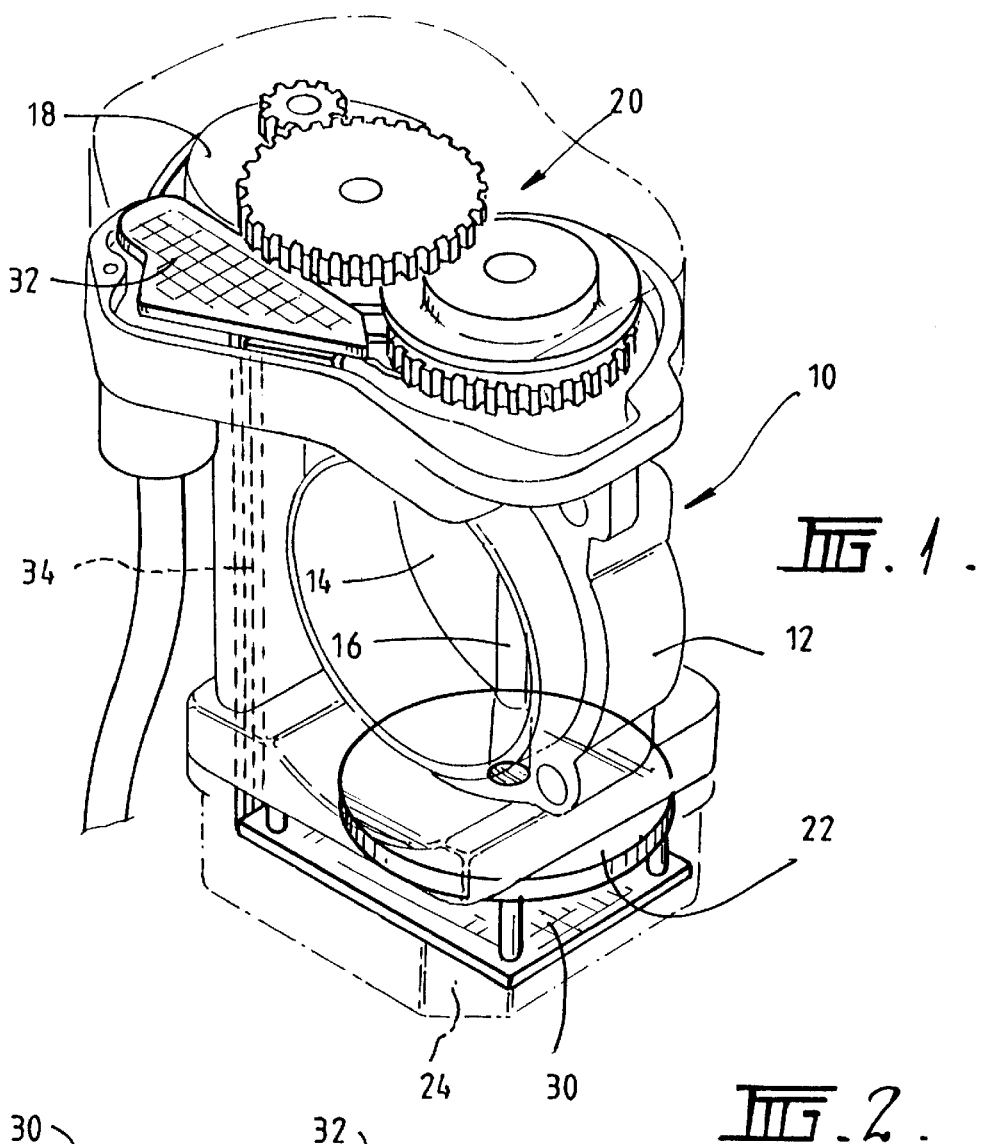
FIG. 1 is a schematic of a manifold valve assembly in which a preferred embodiment of the controller is embedded.

This problem is overcome in the preferred embodiment of the invention by designing the controller to be embedded within the throttle actuator casing, as close as possible to the feedback potentiometer 22 in order to reduce noise levels. The casing of the throttle actuator surrounding the potentiometer 22 was extended to form a housing 24 for the electronic controller as shown in broken outline in FIG. 1.

Figure 2:
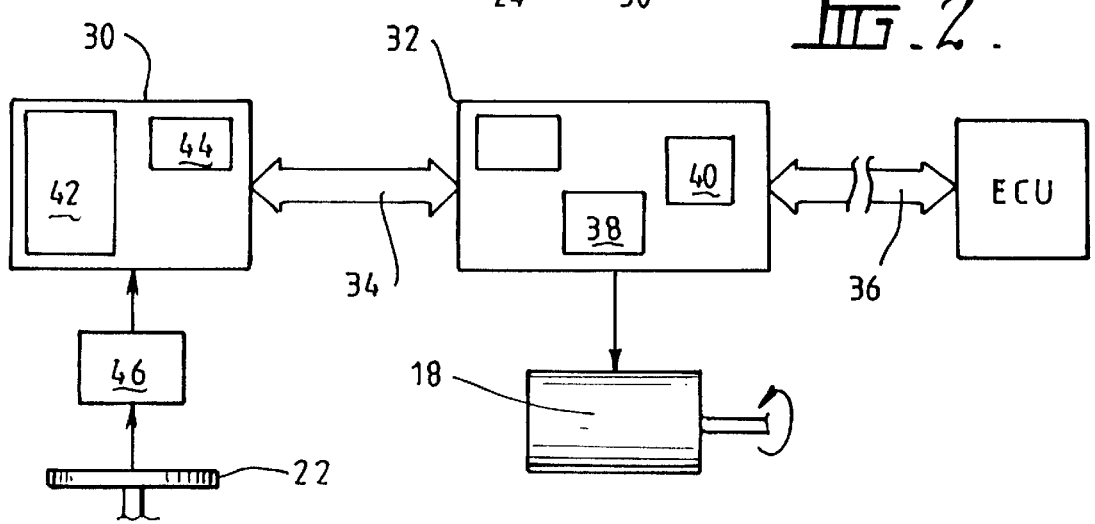
FIG. 2 is a functional block diagram of a preferred embodiment of the manifold valve controller; and, FIG. 3 is a flow chart of a preferred method of controlling the manifold valve of FIG. 1.

FIG. 2 illustrates a preferred embodiment of the controller in block diagram form. The controller is divided into two printed circuit boards, a control board 30 and a driver board 32. The driver board 32 is located in close proximity to the servomotor 18 while the control board 30 is placed near the feedback potentiometer 22. A cable 34 interconnects the two boards. Both the control board 30 and the driver board 32 employ circuit components that can withstand the higher temperatures that may be encountered within the housing of the throttle actuator.

The driver board 32 accepts an incoming cable 36 from the engine control unit (ECU) which carries both power and communication signals. The driver board 32 provides reverse polarity and transient over-voltage protection for the power signals and the four communication signals are transient protected with 5 volt surge suppressors. These incoming wires are soldered directly to the driver printed circuit board. The servomotor 18 is controlled by an H-bridge driver (TV 18200T). The control signals to and from the H-bridge driver are provided by the control board 30 via the 14 pin header and cable 34.

The core of this embodiment of the manifold valve controller is the single chip microcontroller 42 on the control board 30. This is a PIC16C74 microcontroller from the PIC family manufactured by Microchip Technology Inc. The microcontroller 42 uses a 20 MHz crystal and runs with a cycle time of 200 nano-seconds. The input supply voltage of nominally 24 volts is regulated to 5 volts using a switch mode regulator 44 (LM2575-5.0) which provides the digital voltage supply for the controller. A linear 5 volt regulator provides an analogue supply voltage. An L-C filter is used to produce a reference supply for the 12 bit serial analog-to-digital 46 (ADC) from the analog supply voltage. The ADC 46 (MAX 189) converts the voltage from the feedback potentiometer 22 into a 12 bit digital value that is read serially by the microcontroller 42. A dual differential line receiver converts the communication signals to TTL level clock and data signals.

The software employed is based upon a non-premptive real-time operating system for the PIC16C74 microcontroller 42. The main functions for the microcontroller 42 are:

(1) PID (proportional-integral derivative) control
(2) Trajectory computations
(3) Pulse width modulation (PWM) output to control the servomotor 22
(4) Communications.

The overall function of the manifold valve controller is to move the manifold valve to a demanded position specified by the ECU. The ECU calculates a desired manifold valve position (MVP) based on the current speed and throttle position detected and a comparison of the detected air density and the desired air density within the intake manifold of the engine. If desired, the manifold valve controller may also provide a return signal to the ECU indicative of the current MVP.

The PIC16C74 contains two PWM modules. CCPI will be employed to control the servomotor. The PID control will use the voltage from the feedback potentiometer to determine the current position of the throttle and calculate an error based upon the currently requested position. Piecewise linear trajectory generation is employed to provide optimimum control. A multifunction command interface provides total control over the PID constants, maximum velocity and acceleration.

PID control will be provided in software with the control value derived from the trajectory module and the feedback potentiometer. The output from the PID module will control the PWM module after the appropriate scaling has been applied. The instability caused by integrator windup has been addressed by limiting the integrator once the output has been saturated.

Let e=error e'=rate of change of error

∫e=integral of error with respect to the loop time y=control output u=demand output f=feedback signal for throttle position $K_p$=proportional constant $K_d$=differential constant $K_i$=integral constant e=(u−f) then $$y = K_p * e + K_d * e' + K_i * \int e$$

Movement of the manifold valve 14 is controlled by motion trajectory calculations performed by the microcontroller 42. The motion trajectory will typically accelerate the throttle to a maximum velocity, hold the maximum velocity and then decelerate the throttle to a stop at the demanded position. Maximum velocity and acceleration for the throttle actuator are specified during configuration of the controller. The controller can accept changes in demanded position before the completion of the current control loop. In the case where the current position of the throttle valve has exceeded the new demanded position, or the current velocity of the throttle is such that it cannot decelerate to a stop without passing the new demanded position, then the controller will decelerate the throttle to a stop and reverse it to the new demanded position.

Figure 3A:
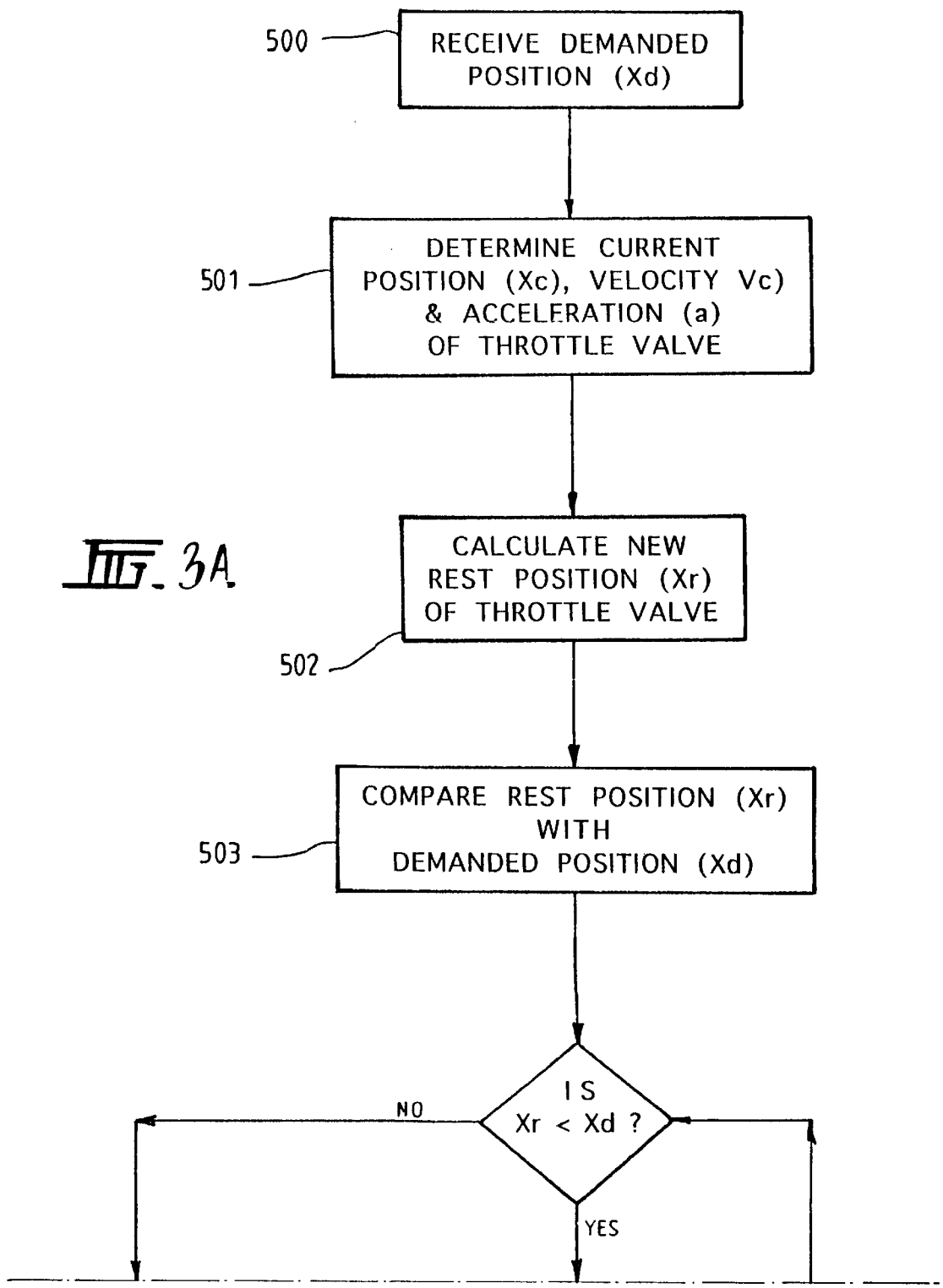
Figure 3B:
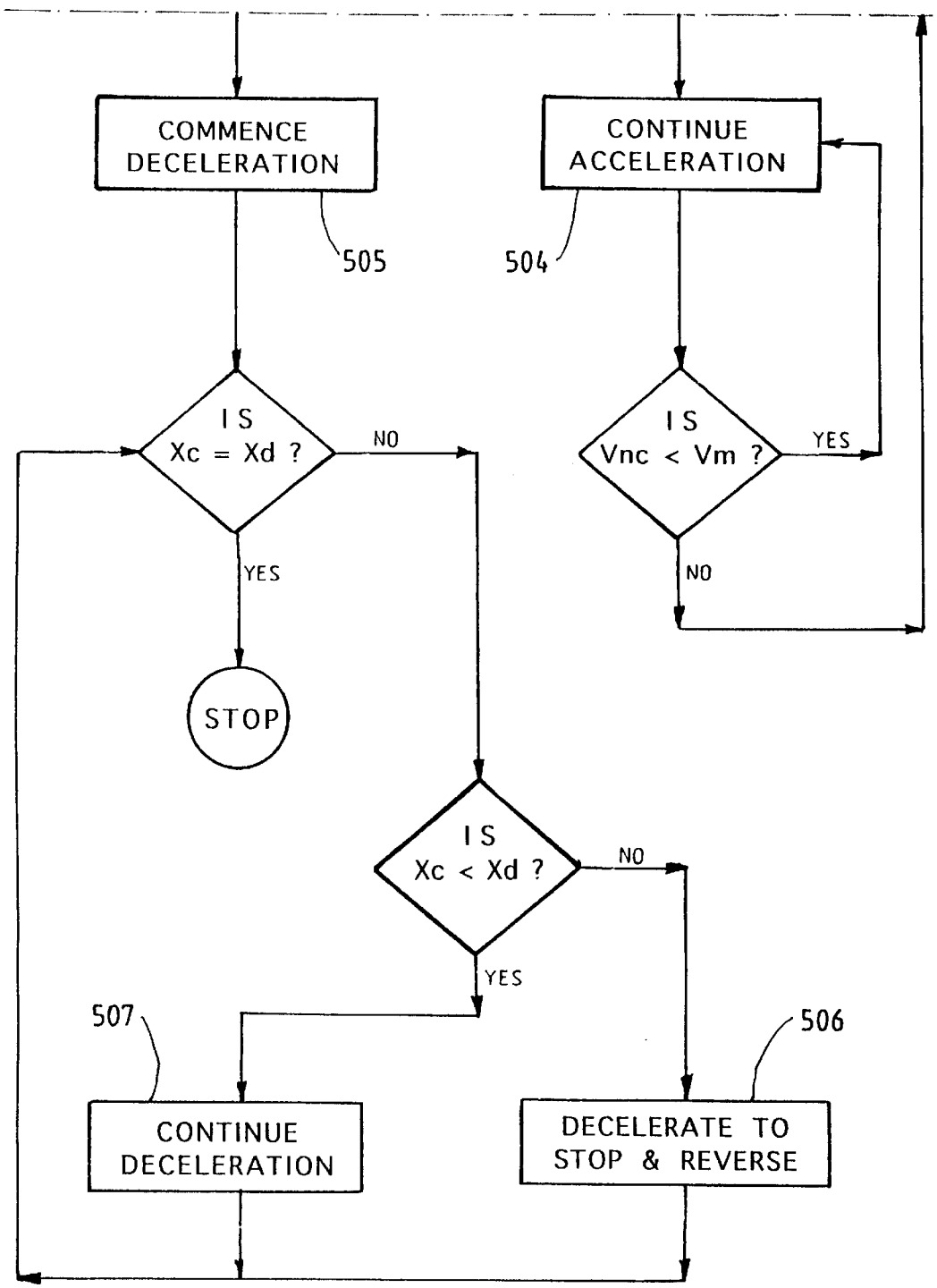

FIG. 3 illustrates in flow chart form a preferred control algorithm for calculating the motion trajectory of the throttle valve.

Let $X_c$=current position $X_r$=rest position
$X_d$=demanded position
$V_c$=current velocity
$V_{nc}$=new velocity for next loop interval
$V_m$=maximum velocity
a=acceleration/deceleration
t—sample time or loop time of microcontroller For any given position the throttle will have a velocity and acceleration from which a rest position may be calculated. At step 501 the rest position is the position reached if the throttle immediately commenced deceleration from its current position and velocity. If the current velocity is zero then the current position is equal to the rest position. Therefore, during each sample time the microcontroller first determines the current position, velocity and acceleration of the throttle valve based on the analog-to-digital converted feedback signal from the potentiometer 22. At step 502 the microcontroller calculates a new rest position based on the following equations:

$$V_{nc}=V_C+at$$

$$X_r=X_c+0.5°(V_{nc}+1)°V_{nc}$$

At step 503 the microcontroller compares the calculated rest position with the new demanded position received at step 500. If the throttle valve is opening and the calculated rest position is less than the demanded position and the maximum velocity has not yet been reached, then the throttle continues to accelerate at step 504. However, if the rest position is equal to or greater than the demanded position $(X_r \geq X_d)$ then the microcontroller commences deceleration at step 505. The new velocity for the next loop interval $(V_{nc})$ is calculated using the equation $V_{nc}=V_c-at$. If the new velocity $V_{nc}$ is greater than the maximum velocity $V_m$ then the new velocity of the throttle is limited to the maximum velocity Control of the servomotor is effected by outputting a demanded position for each controller loop based on the current position and velocity. The demanded position is calculated as follows:

$$X_d=X_c+V_{nc}+a/2$$

Once the controller has calculated a trajectory it uses PID control to move the servomotor so as to place the throttle valve at the demanded position. The pulse width modulated output from the microcontroller 42 is applied to the "direction" input of the H-bridge driver 38 on the driver board 32. Servomotor control is configured so that a 50% duty cycle of the PWM output will provide zero current to the servomotor. As the duty cycle is increased current will be applied to the servomotor so as to open the throttle. Similarly, a duty cycle of less than 50% will result in a reverse current that will attempt to close the throttle. The H-bridge driver 38 provides a current sense output which will be sensed by the microcontroller 42 to determine fault conditions.

The other main function performed by the microcontroller 42 is communications with the driver port 32 and ECU.

The manifold valve has a resolution of 12 bits (4096 positions). Therefore a 12 bit position value is required to set the manifold valve. A complete command comprises of three bytes. The two most significant bits will be used to identify the byte. The remaining bits in the first two bytes will represent the demanded valve position. The remaining bits in the third byte will hold a checksum.

| Byte | Bit 7 | Bit 6 | Bit 5 | Bit 4 | Bit 3 | Bit 2 | Bit 1 | Bit 0 |
|---|---|---|---|---|---|---|---|---|
| One | 0 | 1 | $P_{11}$ | $P_{10}$ | $P_9$ | $P_8$ | $P_7$ | $P_6$ |
| Two | 1 | 0 | $P_5$ | $P_4$ | $P_3$ | $P_2$ | $P_1$ | $P_0$ |
| Three | 1 | 1 | $CS_5$ | $CS_4$ | $CS_3$ | $CS_2$ | $CS_1$ | $CS_0$ | where
$P_n$ represents the $n^{th}$ bit of the 12 bit valve position value
$CS_n$ represents the $n^{th}$ bit of the 6 bit checksum The checksum is calculated by Exclusive OR'ing byte One with byte Two. Note that the two most significant bits of byte three are also obtained by this method.

From the above description of a preferred embodiment of the manifold valve controller, it will be apparent that the manifold valve controller of the present invention provides significant advantages over the previous stepper motor throttle actuator, including the following advantages:

(i) accurate and active control of the manifold valve position (MVP) can be maintained on-the-fly;

(ii) embedding the controller within the throttle actuator minimises the effects of background noise and improves reliability;

(iii) extremely high resolution is achieved over the full sweep of the throttle valve; and, (iv) constant feedback to the controller from the position sensor allows accurate repositioning of the throttle valve in accordance with the MVP specified by the ECU.

Numerous variations and modifications will suggest themselves to persons skilled in the electronics and mechanical arts, in addition to those already described, without departing from the basic inventive concepts For example, another type of position sensor element may be employed in place of the potentiometer, for example a digital encoder, in order to provide a feedback signal to the controller from which the current position, velocity and acceleration of the throttle valve may be calculated. All such variations and modifications are to be considered within the scope of the present invention, the nature of which is to be determined from the foregoing description and the appended claims.

What is claimed is:

1. A manifold valve controller for controlling the position of an engine manifold valve the controller comprising:

means for sensing the current position and current velocity of the valve;

control processing means for calculating a rest position of the valve using said sensed current position and sensed current velocity, wherein said rest position corresponds to a stationary position reached if the valve commenced deceleration from its current position and velocity; comparing said calculated rest position with a demanded position in order to determine whether the current position or rest position exceeds the demanded position; and, generating a control signal for accelerating/decelerating the valve to the demanded position as required.

2. An engine manifold valve controller as defined in claim 1, further comprising a driver circuit operatively connected to said control processing means, for generating a driver signal for driving the valve to the demanded position in response to said control signal.

3. An engine manifold valve controller as defined in claim 2, wherein the controller is embedded within the housing of a throttle actuator which incorporates a throttle body, a butterfly valve, a servomotor and associated gearing, and a feedback position sensor.

4. An engine manifold valve controller as defined in claim 3, wherein said means for sensing the current position and current velocity of the valve comprises said feedback position sensor.

5. An engine manifold valve controller as defined in claim 4, wherein said control processing means is provided on a first printed circuit board mounted adjacent the feedback position sensor, and said driver circuit is provided on a second printed circuit board mounted adjacent the servomotor.

6. A method for controlling the position of an engine manifold valve, the method comprising the steps of:

sensing the current position and current velocity of the valve;

calculating a rest position of the valve using said sensed current position and current velocity, wherein said rest position corresponds to a stationary position reached if the valve commenced deceleration from its current position and velocity;

comparing said calculated rest position with a demanded position for the valve in order to determine whether the current position or the rest position exceeds the demanded position; and, accelerating/decelerating the valve to the demanded position as required, based on said comparison.

7. A method for controlling the position of an engine manifold valve as defined in claim 6, wherein said step of accelerating/decelerating comprises calculating a motion trajectory that involves accelerating the valve to a maximum velocity, holding it at the maximum velocity and then decelerating the valve to a stop at the demanded position.

8. A method for controlling the position of an engine manifold valve as defined in claim 7, wherein said motion trajectory is calculated such that if the valve is opening and the calculated rest position is less than the demanded position, and the maximum velocity has not yet been reached, then the valve is caused to continue to accelerate, whereas if the calculated rest position is equal to, or greater than the demanded position then the valve is caused to decelerate.

9. A method for controlling the position of an engine manifold valve as defined in claim 8, wherein said motion trajectory is calculated such that if the current position exceeds the demanded position or the current velocity of the throttle is such that it cannot decelerate to a stop without passing the demanded position, then the valve is caused to decelerate to a stop and reverse to the demanded position.

10. A method for controlling the position of an engine manifold valve as defined in claim 7, wherein said step of calculating a motion trajectory involves generating a piecewise linear trajectory to provide optimum control over the motion of the valve.

11. A method for controlling the position of an engine manifold valve as defined in claim 7, wherein said step of accelerating/decelerating the valve further comprises employing proportional-integral-derivative (PID) control to control the movement of the valve.

12. A method for controlling the position of an engine manifold valve as defined in claim 11, wherein said PID control employs said sensed current position of the valve to calculate an error based on the currently demanded position for the valve.

* * * * *